United States Patent
Eaton et al.

(10) Patent No.: US 10,479,156 B2
(45) Date of Patent: Nov. 19, 2019

(54) FORGED PORTAL HUB MOUNTING BODY

(71) Applicant: Super ATV, LLC, Madison, IN (US)

(72) Inventors: Justin L. Eaton, Versailles, IN (US);
Damon Stephan, Madison, IN (US);
Jordan E. Stephan, Hanover, IN (US);
Penny Zuckschwerdt, Madison, IN (US); Chuck Hensler, Madison, IN (US); Chris Shelton, Madison, IN (US)

(73) Assignee: Super ATV, LLC, Madison, IN (US)

(*) Notice: Subject to any disclaimer, the term of this patent is extended or adjusted under 35 U.S.C. 154(b) by 291 days.

(21) Appl. No.: 15/270,128

(22) Filed: Sep. 20, 2016

(65) Prior Publication Data

US 2017/0097084 A1 Apr. 6, 2017

Related U.S. Application Data

(60) Provisional application No. 62/236,209, filed on Oct. 2, 2015.

(51) Int. Cl.
| | |
|---|---|
| *B60G 9/02* | (2006.01) |
| *B60K 17/04* | (2006.01) |
| *B60B 35/00* | (2006.01) |
| *B60B 35/16* | (2006.01) |

(52) U.S. Cl.
CPC .............. *B60G 9/02* (2013.01); *B60B 35/001* (2013.01); *B60K 17/04* (2013.01); *B60B 35/163* (2013.01); *B60B 35/166* (2013.01)

(58) Field of Classification Search
CPC . B60G 9/02; B60G 9/025; B60G 3/20; B60G 2206/50; B60G 2206/722; B60G 2204/419; B60K 17/043; B60K 17/303; B60K 17/046; B60K 17/04; B60B 35/007; B60B 35/006; B60B 35/163; B60B 35/166; B60B 35/001; F16H 57/022; F16H 57/025; F16H 57/03; B61D 13/02
See application file for complete search history.

(56) References Cited

U.S. PATENT DOCUMENTS

| | | | |
|---|---|---|---|
| 1,184,814 A | 5/1916 | Bollstrom | |
| 1,316,918 A | 9/1919 | Nogrady | |
| 1,396,102 A | 11/1921 | Dunham et al. | |
| 4,344,501 A | 8/1982 | Jerry et al. | |
| 4,618,159 A | 10/1986 | Kozyra et al. | |
| 4,674,760 A | 6/1987 | Goulart | |
| 7,909,127 B1 * | 3/2011 | Pionke | B60K 17/303 180/252 |
| 8,118,133 B2 | 2/2012 | Armfield | |
| 8,985,264 B2 | 3/2015 | Shirley | |

FOREIGN PATENT DOCUMENTS

EP 1049140 11/1966

* cited by examiner

*Primary Examiner* — Daniel D Yabut
(74) *Attorney, Agent, or Firm* — Woodard, Emhardt, Henry, Reeves & Wagner, LLP

(57) ABSTRACT

A portal hub assembly for raising the chassis of a vehicle. The portal hub assembly includes a portal box and a mounting assembly removably attachable to one side of the portal box. The mounting assembly includes a mounting body forged as a unitary body. A bracket assembly including at least one mounting bracket is selectively attachable to the mounting body to allow the mounting assembly to receive a component of the suspension system of a desired vehicle.

21 Claims, 17 Drawing Sheets

# FORGED PORTAL HUB MOUNTING BODY

CROSS REFERENCE TO RELATED APPLICATIONS

This application claims priority to U.S. Provisional Patent Application No. 62/236,209, filed Oct. 2, 2015; which is incorporated herein by reference.

BACKGROUND

This disclosure is in the field of vehicle lift kits.

It may be desirable to increase the height of a body of a vehicle by adding a suspension lift or a lift kit. This may be done to increase the ground clearance of the vehicle, allow the installation of larger wheels and tires, for aesthetics, or a variety of other reasons. A portal hub may be used to lift the chassis and suspension of a vehicle by moving the axle of the vehicle from the center of a wheel to a location above the center of the wheel. Additionally, a reduction gearbox may be included in the portal hub to reduce the torque on the axle to counter the effect of larger diameter wheels.

DETAILED DESCRIPTION OF THE DRAWINGS

Figure 1:
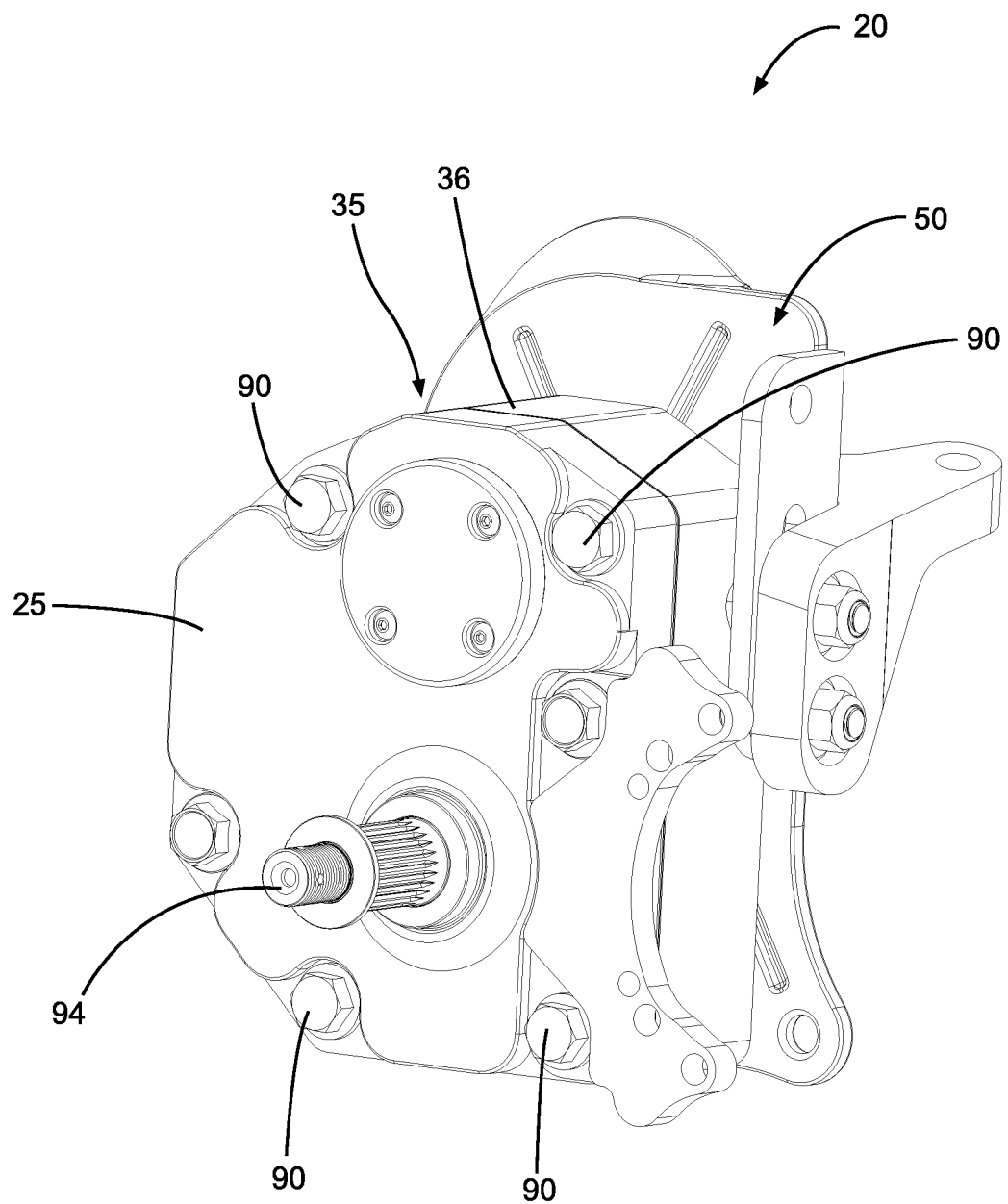
FIG. 1 is a front perspective view of a portal hub assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

Because different models of vehicles have different suspension mount geometries, the mounting structure of the portal hub must be different for different vehicles. However, it may be costly to manufacture custom portal hubs with mounting structures for every model of vehicle. Therefore, it would be beneficial to provide a portal hub assembly that includes a mounting structure that may configured separately from the portal box to operate with a variety of different vehicles.

The present disclosure pertains to a portal hub assembly. Aspects of the present disclosure include a portal box and an input shaft and an output shaft operatively attached to the portal box. A mounting assembly is removably attached to one side of the portal box. The mounting assembly includes a mounting body that has a complex geometry forged as a unitary body. In certain embodiments, one side of the mounting body includes grooves and the opposite side of the mounting body includes ribs extending from the mounting body. The mounting body is universal and may be attached to any model of vehicle.

The mounting assembly also includes a bracket system including at least one mounting bracket attached to the mounting body at a location that allows the mounting bracket to receive a component of a vehicle suspension system (for example, a ball joint). In some embodiments, the bracket system may include two or more mounting brackets and each mounting bracket may be adapted to receive different parts of the vehicle suspension system, for example, the top or bottom of a ball joint.

In certain embodiments, a group of different bracket systems adapted for different vehicles may be available to be selected to be attached to the mounting body. Each of the different bracket systems may be configured to receive the suspension system of a different model of vehicle. When constructing the mounting assembly, the correct bracket system is chosen for the desired model of vehicle and then attached to the mounting assembly at the correct location.

Some embodiments may also include a steering rod bracket that is attached to the mounting body. A variety of different steering rod brackets configured for different vehicles may be available to be attached to the mounting body. Each of the different steering rod brackets may be adapted to attach to the steering rod of a different model of vehicle. The correct steering rod bracket is chosen for the model of vehicle on which the portal hub assembly is to be mounted, and the steering rod bracket is then coupled to the mounting body at the correct position for the desired vehicle.

In some embodiments, a certain geometry may be used for a mounting body that is included on the portal hub assembly attached to a wheel on the left side of a vehicle. The mounting body for a portal hub assembly attached to a wheel on the right side of the vehicle may be an exact mirror image of the mounting body for the left side of the vehicle.

This description uses the terms wheel side and vehicle side as a point of reference for describing the position of various components of the portal hub assembly. The term "wheel side" is used to describe the side of the portal hub assembly facing a wheel when installed. The output of the portal hub assembly is on the wheel side. The term "vehicle side" is the side of the portal hub assembly that faces the vehicle when installed. The input to the portal hub assembly is on the vehicle side.

The term "unitary body" as used in this description means any object that is formed as a single piece using a single process. A unitary body is complete without requiring the addition or attachment of another object.

The term "rib" as used in this description means a protrusion, ridge, elevated body, or similarly elevated structure running along an object. The rib may be used to stiffen and provide strength to the object and may also provide support for attached objects.

The term "groove" as used in this description means a cut, depression, channel, or any other form of recessed cavity formed in the surface of an object.

Figure 2:
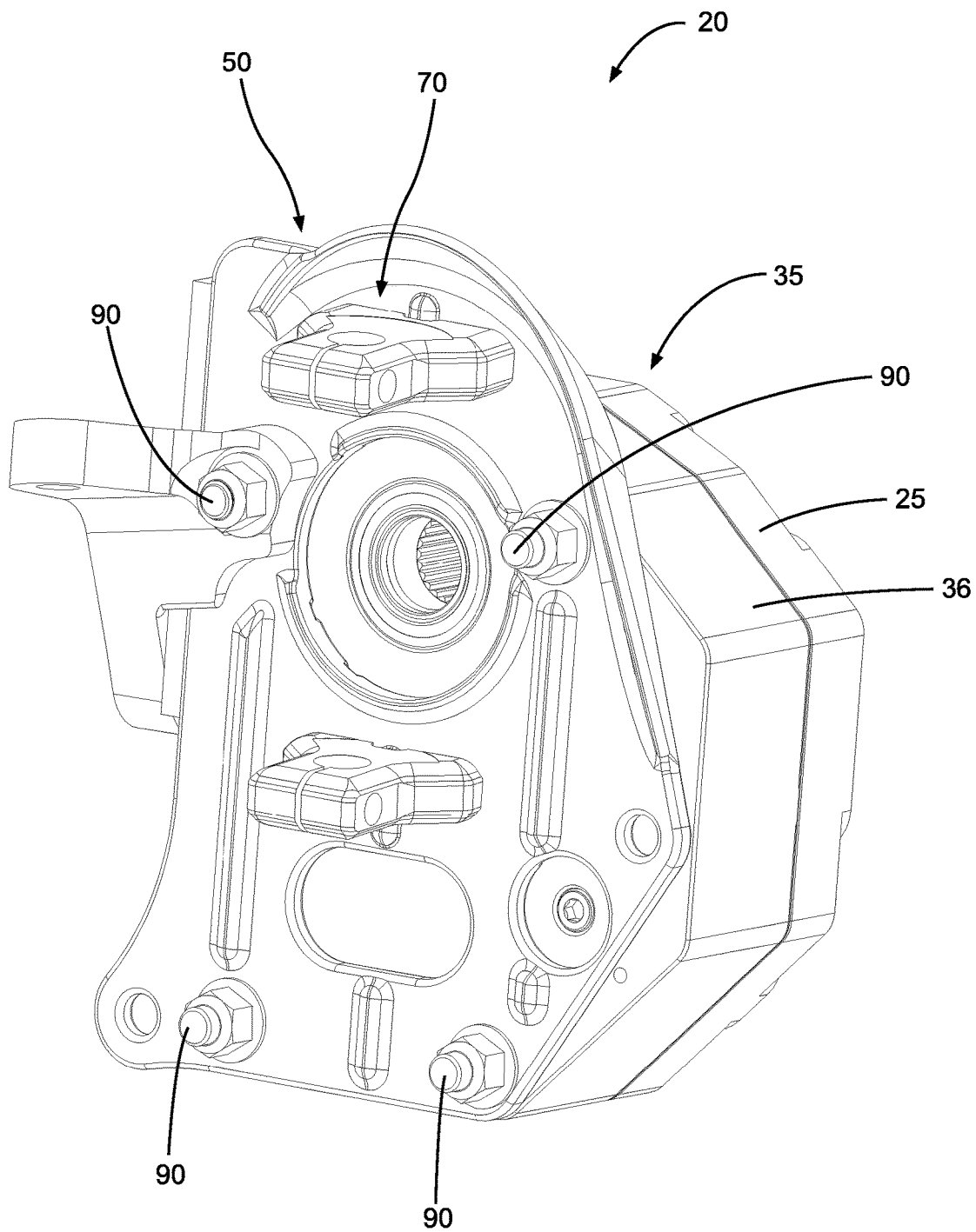
FIG. 2 is a rear perspective view of the portal hub assembly of FIG. 1.
Figure 3:
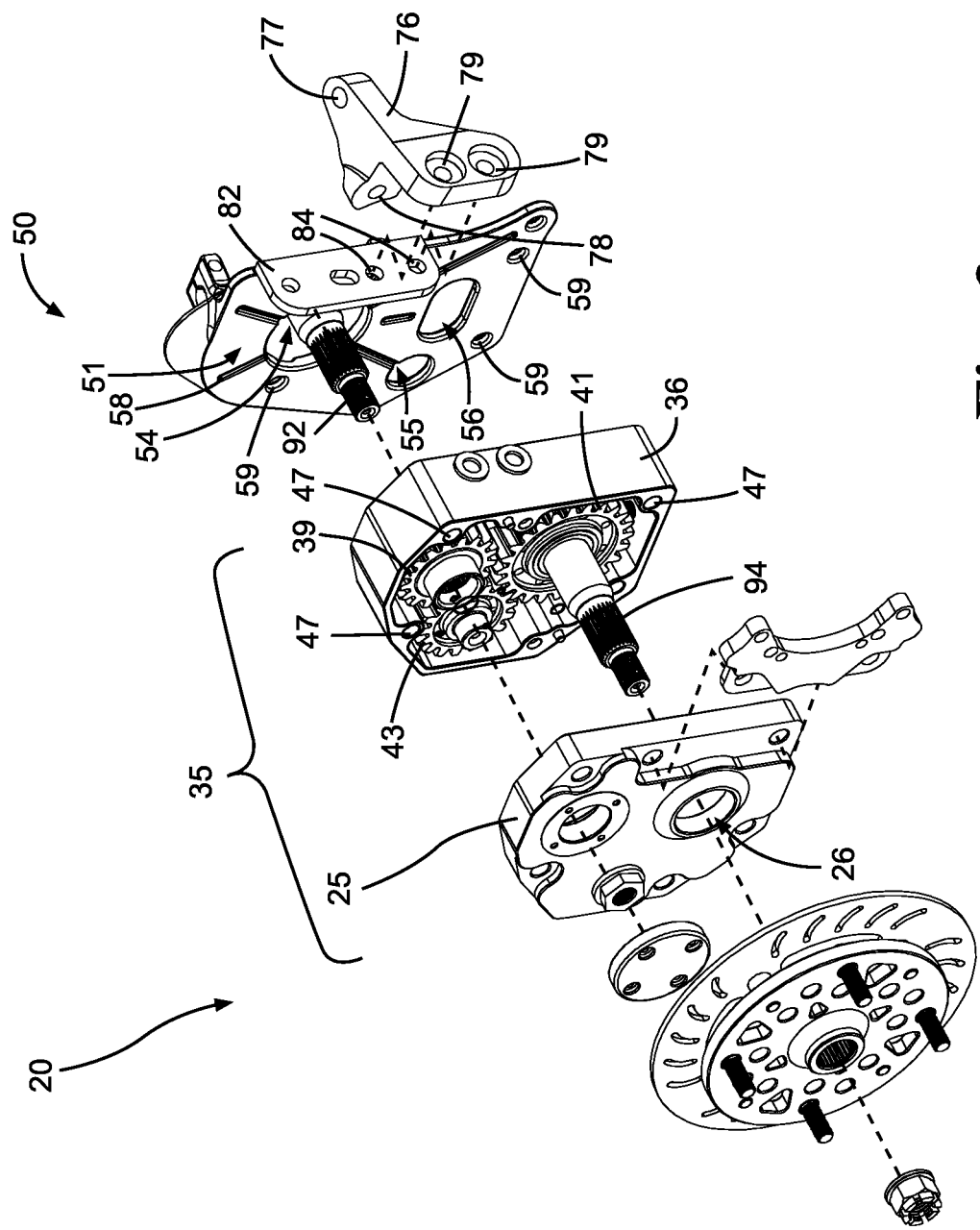
FIG. 3 is an exploded view of the portal hub assembly of FIG. 1.

FIGS. 1-3 illustrate a portal hub assembly 20. Portal hub assembly 20 may be installed between the wheel of a vehicle and the vehicle to vertically lift the axle of the vehicle above the center of the wheel hub to provide greater ground clearance for the vehicle. The illustrated portal hub assembly 20 is intended for use with a front wheel of a vehicle that has front wheel steering, as portal hub assembly 20 includes an attachment point for a steering rod. Portal hub assemblies for use with the rear wheels of the same vehicle may be configured differently.

Portal hub assembly 20 generally includes a portal box 35 and a mounting assembly 50. Portal box 35 includes a cover 25 and a housing 36. Cover 25 is attached to one side of housing 36 and includes an output opening 26. Mounting assembly 50 is attached to the side of housing 36 opposite cover 25. Attachment members 90 extend through openings defined in cover 25, housing 36, and mounting assembly 50 to couple portal box 25 and mounting assembly 50 together. Attachment members 90 may be a nut and bolt assembly as shown in FIG. 1; however, in other embodiments, attachment members 90 may be any suitable securement mechanism.

Figure 4:
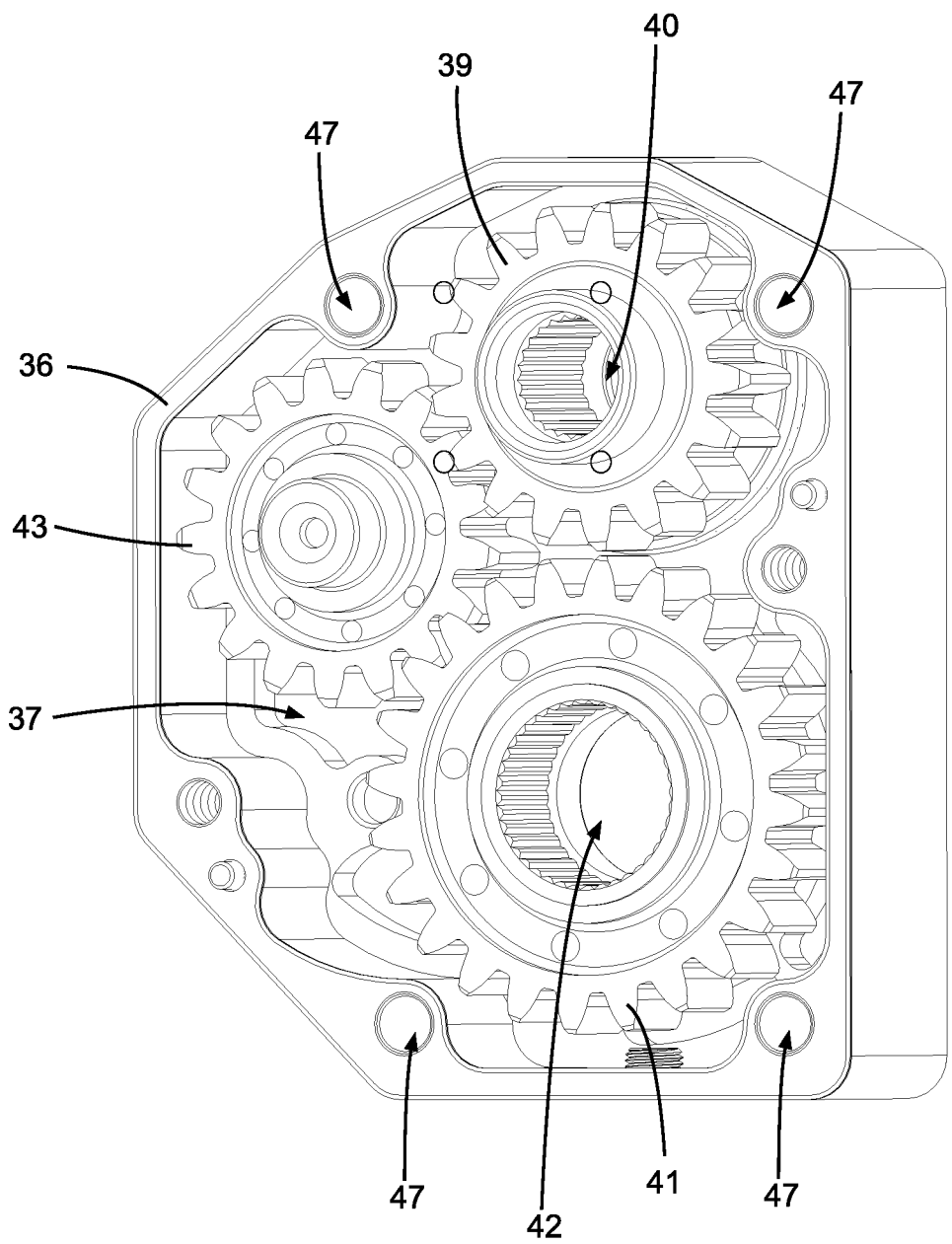
FIG. 4 is a perspective view of a portal box, a component of the FIG. 1 assembly, with a cover removed from a portal box.

FIG. 4 shows portal box 35 attached to mounting assembly 50 with cover 25 removed. Housing 36 defines an interior 37. Housing 36 also defines an input opening 40 for receiving an input shaft and an output opening 42 for receiving an output shaft. Output opening 42 is vertically displaced from input opening 40.

In the embodiment of portal box 35 shown in FIG. 4, a spur gear system is located in the interior 37 of housing 36. The illustrated spur gear system includes an input gear 39, an output gear 41, and an idler gear 43. Input gear 39 defines input opening 40, and the interior surface of input gear 39 is splined to receive and engage an input shaft 92, so that rotation of an input shaft 92 from a vehicle that is inserted into input opening 40 causes input gear 39 to turn. The teeth of input gear 39 engage the teeth of idler gear 43, causing idler gear 43 to rotate with input gear 39. The teeth of idler gear 43 also engage the teeth of output gear 41, so rotating idler gear 43 causes output gear 41 to also rotate. Output gear 41 defines an output opening 42 and the interior surface of output gear 41 is splined to receive and engage output shaft 94. Output opening 42 is aligned with output opening 26 (see FIG. 3) in cover 25. When output shaft 94 is inserted into output opening 42, rotation of output gear 41 causes output shaft 94 to also rotate. The sizes and number of teeth of input gear 39 and output gear 41 may be varied to provide different gear ratios between the input and output gears.

The gear system shown in portal box 35 is merely a representative example of one type of system that may be used to transmit the rotation of an input shaft to a vertically displaced output shaft. Other embodiments may include any other type of system that effectively transmits the rotation of an input shaft to an output shaft. For example, some embodiments of portal box 35 may include fewer or more gears. Portal box 35 may include two or three idler gears 43, or portal box 35 may include only an input gear 39 and output gear 41 and have no idler gear 43. Some embodiments of portal box 35 may not include a gear system, but rather include chain or belt systems that transmit rotation of the input shaft to the output shaft with or without a change in ratio.

Figure 5:
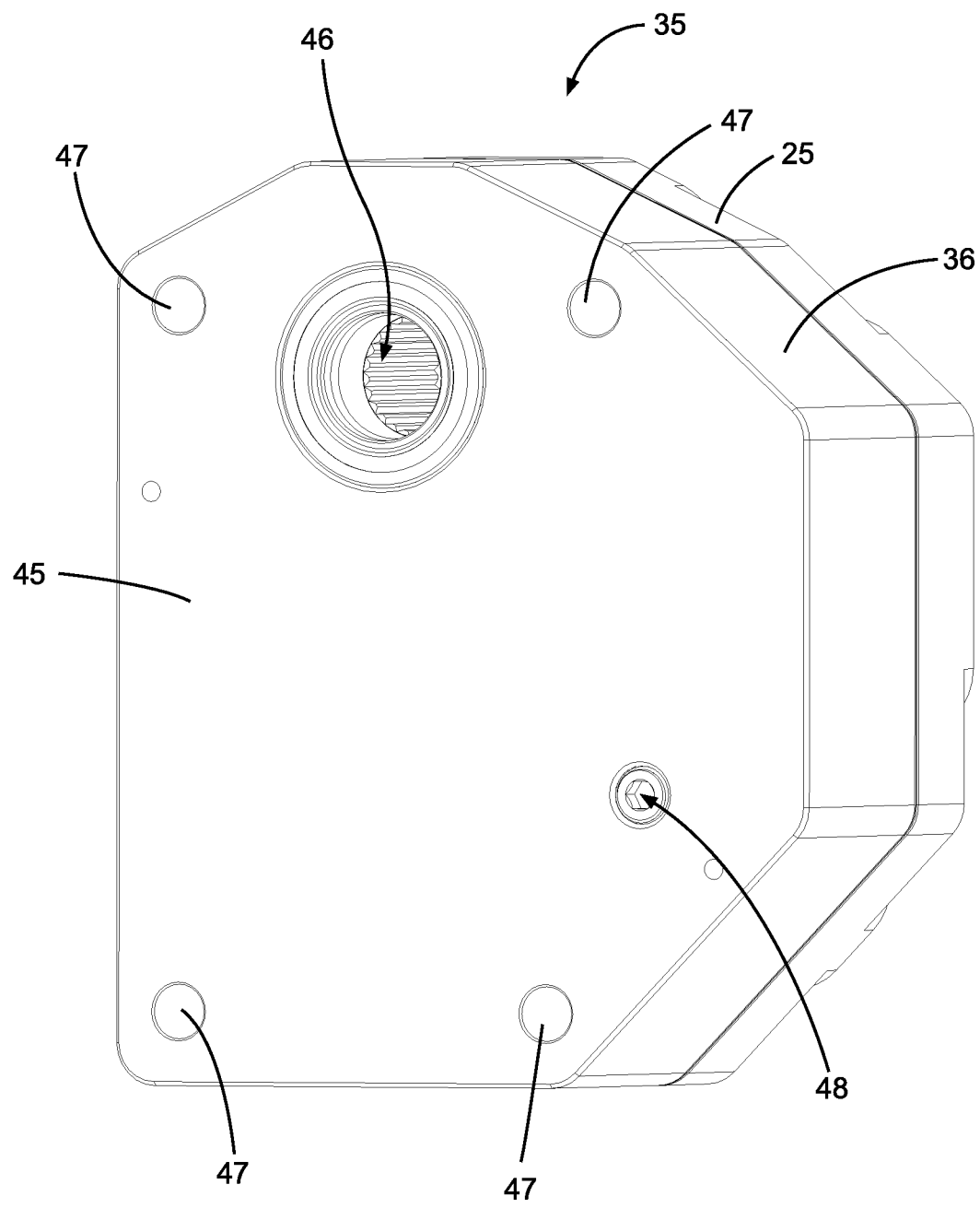
FIG. 5 is a rear perspective view of the portal box of the portal hub assembly of FIG. 1.

The vehicle side 45 of portal box 35 is shown in FIG. 5. Vehicle side 45 is flat and substantially planar, forming a surface on which portal box 35 may contact mounting assembly 50 when portal box 35 is attached to mounting assembly 50. An input opening 46 is positioned near the upper portion of vehicle side 45. Input opening 46 is aligned with input opening 40 through input gear 39 when input gear 39 is inserted into the interior 37 of housing 36. Additionally, portal box 35 defines attachment openings 47 which are adapted to provide clearance for attachment members 90 that attach portal box 35 to mounting assembly 50 and cover 25. As shown, there are four attachment openings 47; however, in other embodiments there may be more or fewer attachment openings 47. Portal box 35 also defines access opening 48. Access opening 48 optionally allows access to the interior 37 of portal box 35 so oil or lubricant may be added to the gear system within portal box 35 or other maintenance can be performed without having to disassemble portal hub assembly 20.

Figure 6:
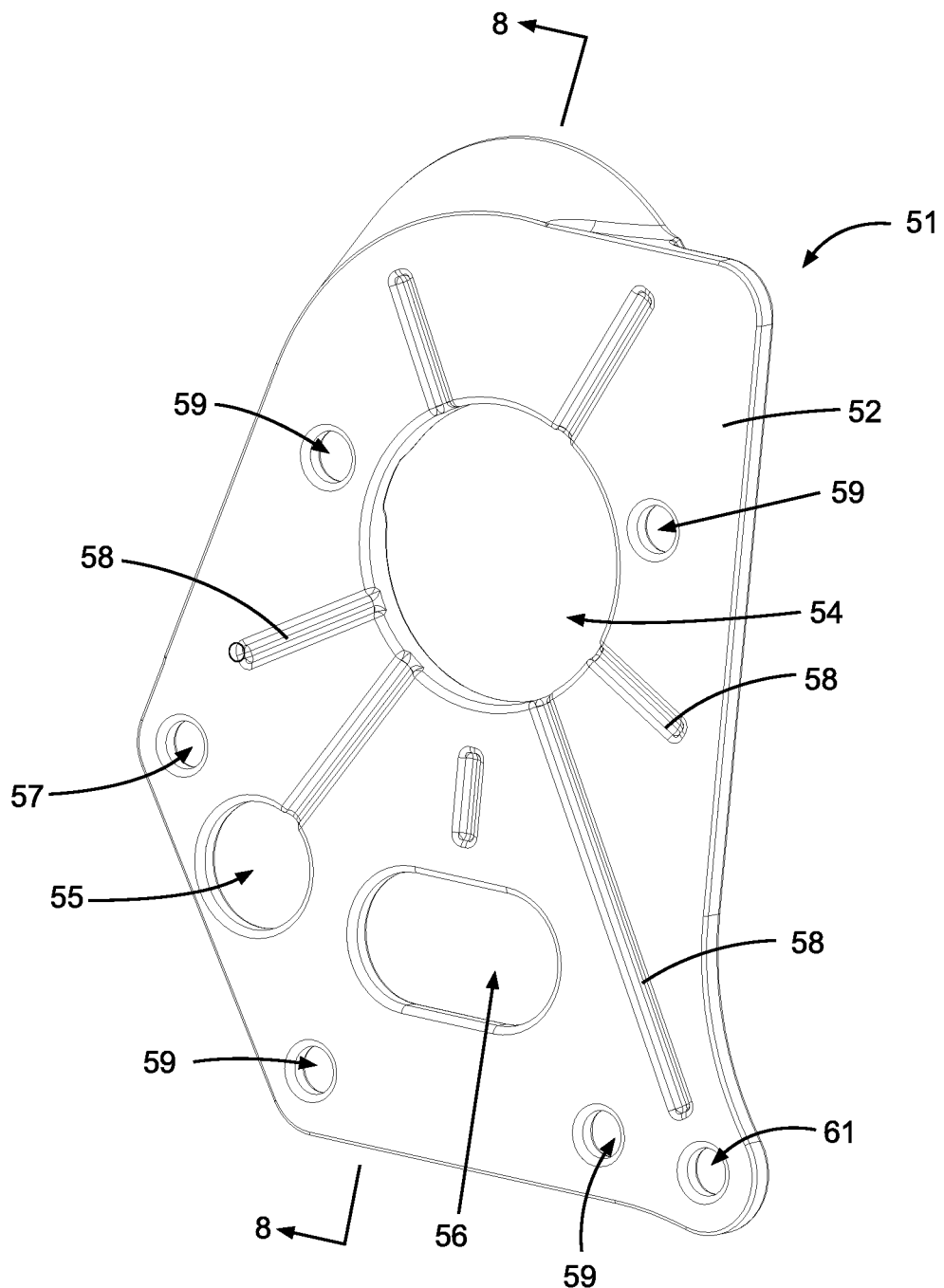
FIG. 6 is a front perspective view of a mounting body, a component of the portal hub assembly of FIG. 1.
Figure 7:
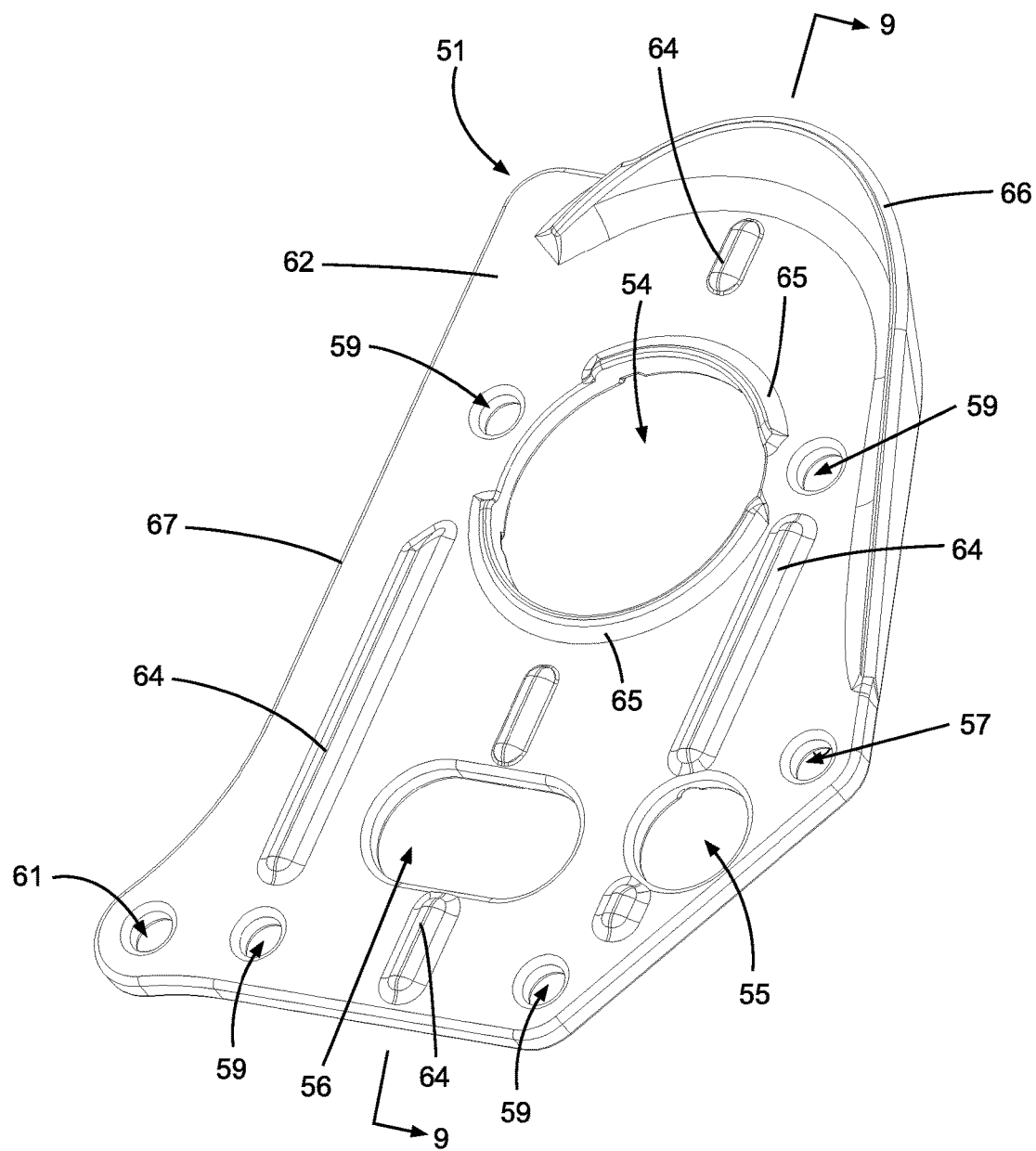
FIG. 7 is a rear perspective view of the mounting body of FIG. 6.

FIGS. 6-7 show a mounting body 51. Mounting body 51 is a complex geometry that is manufactured as a single, forged piece. One embodiment of mounting body 51 is used for the mounting assembly 50 on the left side of a vehicle. An embodiment of mounting body 51 used for the mounting assembly 50 on the right side of the vehicle may be a mirror image of the mounting body 51 used on the left side of the vehicle.

FIG. 6 shows the wheel side of a mounting body 51. The wheel side surface 52 of mounting body 51 defines an overall flat and substantially planar surface shaped to mate against the vehicle side 45 of portal box 35. Mounting body 51 defines an input opening 54, an access opening 55 and an opening 56. Input opening 54 may be configured to permit an input shaft 92 to pass through and align with input opening 40 defined through portal box 35 when mounting assembly 50 is attached to portal box 35. Access opening 55 is positioned on mounting body 51 to align with access opening 48 defined through portal box 35 when mounting assembly 50 is attached to portal box 35. In other embodiments, the position of input opening 54 and access opening 55 may be found in different locations to match the position of the input opening 40 and access opening 48 in a different embodiment of portal box 35.

Mounting body 51 also defines grooves 58 in wheel side surface 52. In the embodiment shown, grooves 58 are arranged in a sunburst pattern extending radially from input opening 54. Grooves 58 are generally linear in shape and include rounded surface transitions to minimize stress concentrations. However, in other embodiments the number of grooves 58 and the arrangement of grooves 58 may be varied. For example, some embodiments may include no grooves 58, or grooves 58 may be parallel and extend vertically on wheel side surface 52, or grooves 58 may take any other desired shape and orientation.

Attachment openings 59 are defined through mounting body 51 and positioned to align with attachment openings 47 of portal box 35 when mounting assembly 50 is attached to portal box 35. Attachment openings 59 are sized to receive attachment members 90 so that attachment members 90 may be inserted through attachment openings 47, 59 to attach mounting assembly 50 to portal box 35.

Mounting body 51 defines additional openings 57, 61 as potential attachment points. Opening 57 is located near an edge of mounting body 51. Opening 61 is located in a lower corner of mounting body 51. Openings 57, 61 may receive attachment members 90 for attaching mounting assembly 50 onto other embodiments of portal boxes that have different geometries than portal box 35.

The vehicle side of mounting body 51 is shown in FIG. 7. The vehicle side of mounting body 51 may include an irregularly shaped vehicle side surface 62 that includes several generally flat partitions separated by ribs 64 that protrude from vehicle side surface 62. Input opening 54, access opening 55, and opening 56 extend through vehicle side surface 62. A ridge 65 extends from vehicle side surface 62 and surrounds portions of the perimeter of input opening 54. In the embodiment shown in FIG. 7, ridge 65 does not extend completely around the perimeter of input opening 54, instead there are multiple portions of ridge 65 and portions of input opening 54 that are not surrounded by ridge 65. In other embodiments, ridge 65 may form a continuous ring around the perimeter of input opening 54.

Ribs 64 may provide additional rigidity and strength to mounting body 51 compared to a flat plate with similar mass. In the embodiment shown in FIG. 7, there are six ribs 64, and each of the ribs 64 are parallel to each other and oriented vertically. In other embodiments, the number of ribs 64 may be changed so there are more or fewer ribs. For example, there may be no ribs, only one rib, or seven or eight ribs. The orientation of the ribs 64 may also be changed in other embodiments. For example, ribs 64 may be arranged in a sunburst pattern similar to the grooves 58 on wheel side surface 52, or some ribs 64 may be horizontal or angled.

In the embodiment shown, the top edge 66 of mounting assembly 50 is arched and defines an enlarged rib structure that provides additional strength and rigidity to mounting body 51. The arched top edge 66 projects farther from vehicle side surface 62 than the other ribs 64. The arched top edge 66 may act as a guide for attachment of mounting brackets as described below. Arched top edge 66 may also provide additional strength and rigidity to mounting assembly 50. Other embodiments may have a top edge that is curved differently, a top edge that is straight, or a top edge that is any other shape that allow portal hub assembly to fit into different styles of vehicles.

The geometry of mounting body 51 allows mounting assembly 50 to be attached flush to portal box 35 only when wheel side surface 52 of mounting body 51 is mated with vehicle side 45 of portal box 35. If mounting assembly 50 were attached to portal box 35 so that vehicle side surface 62 of mounting body 51 is mated with vehicle side 45 of portal box 35, ribs 64 and curved top edge 66 would not permit a flush connection.

Figure 8:
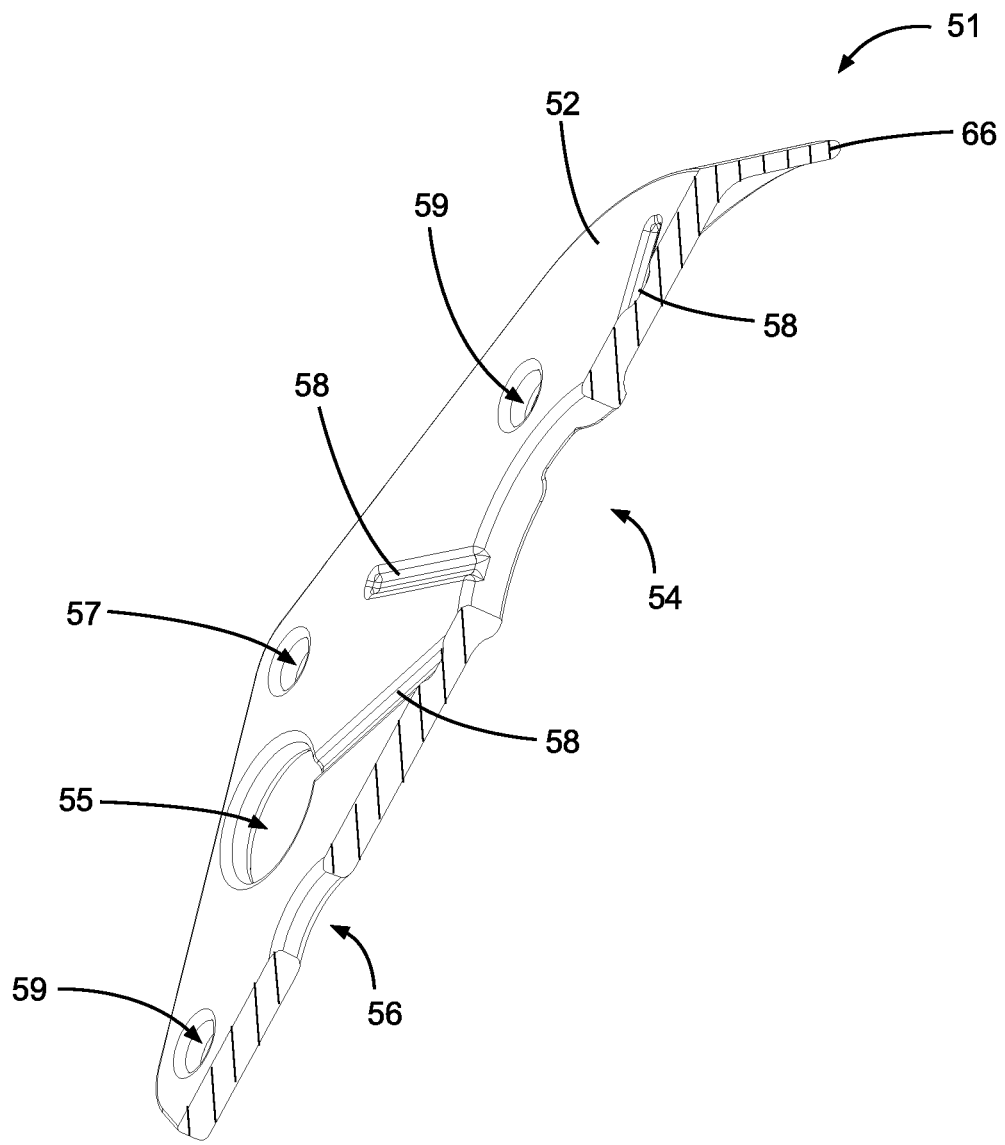
FIG. 8 is a front cross-sectional view of the mounting body of FIG. 6 cut along line 8-8.
Figure 9:
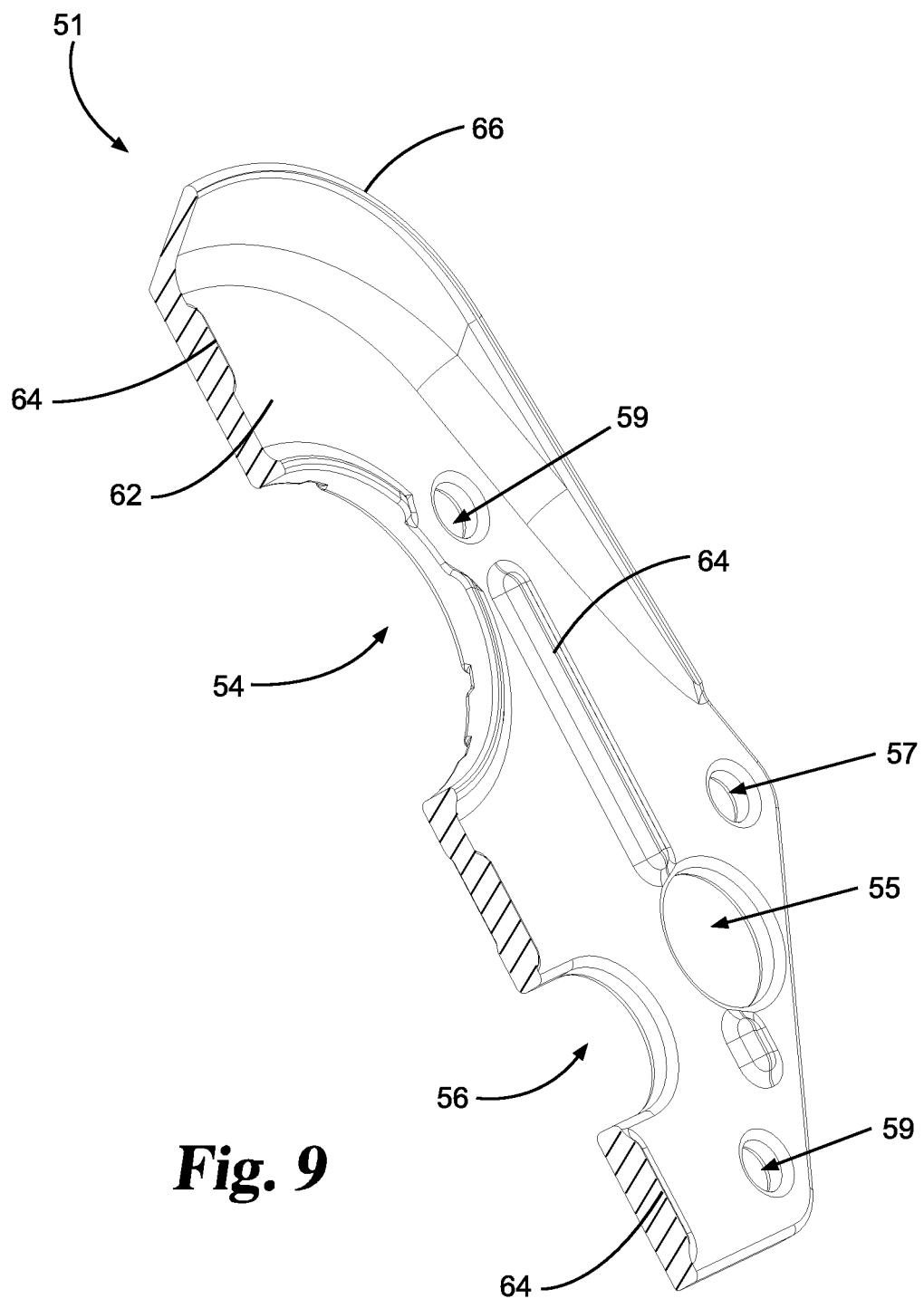
FIG. 9 is a rear cross-sectional view of the mounting body of FIG. 7 cut along line 9-9.

FIGS. 8-9 show a cross-sectional view of the mounting body. The view of the wheel side of mounting body 51 shown in FIG. 8 shows the generally flat wheel side surface 52. Grooves 58 interrupt the flat wheel side surface 52 but do not project from wheel side surface 52. As seen in FIG. 9, the vehicle side of mounting body 51 is not flat. Ribs 64 project from vehicle side surface 62. Top edge 66 projects from the top of wheel side surface 52 and extends substantially farther than ribs 64.

Figure 10:
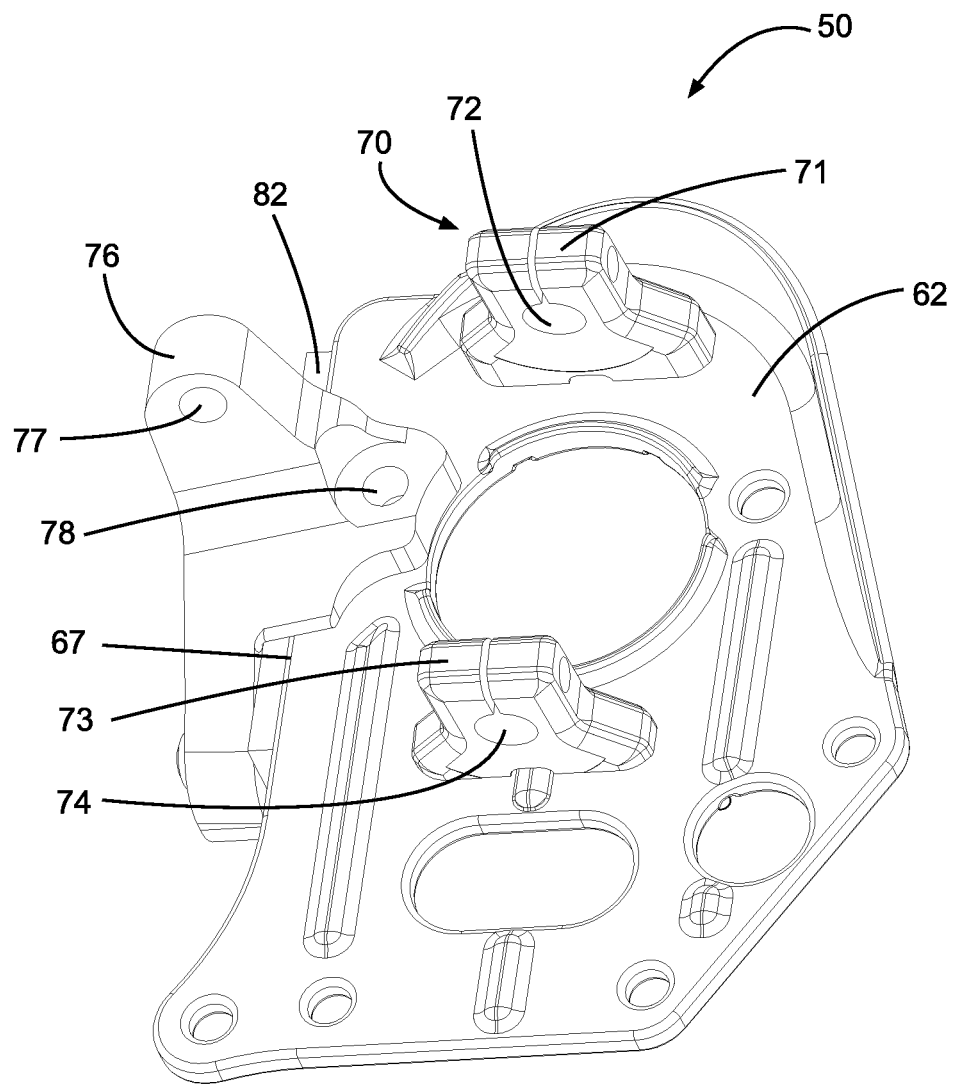
FIG. 10 is a rear perspective view of a mounting assembly, a component of the portal hub assembly of FIG. 1, with a first type of bracket system and a steering rod bracket attached to the mounting body.

FIG. 10 shows a rear view of mounting assembly 50. As can be seen, mounting assembly 50 includes a bracket system 70 and a steering rod bracket 76. Bracket system 70 includes two mounting brackets 71, 73. Each mounting bracket 71, 73 may be welded or otherwise permanently attached to vehicle side surface 62 of mounting assembly 50 and extends away from the vehicle side of mounting assembly 50. In other embodiments, mounting brackets from mounting system 70 may be removably attached using fasteners or other suitable attachment methods. Mounting brackets 71, 73 are configured to receive a component of a vehicle suspension system, such as a ball joint (not shown). Each mounting bracket 71, 73 includes an opening 72, 74 through which an attachment mechanism such as a bolt may be inserted to secure the vehicle suspension component to the mounting bracket 71, 73.

A spacer plate 82 is optionally attached to an edge 67 of mounting assembly 50. Spacer plate 82 may be attached by adhesive, by welding, by fasteners, or any other suitable attachment method, or spacer plate 82 may be integrally formed with mounting assembly 50. Spacer plate 82 may include openings 84 (see FIG. 3) that allow a steering rod bracket 76 to be attached spacer plate 82. Steering rod bracket 76 is configured to provide an attachment point for a steering rod to connect the steering rod to portal hub assembly 20. An opening 77 defined through steering rod bracket 76 may receive an attachment member for attaching steering rod bracket 76 to the steering rod of a vehicle.

An attachment opening 78 defined through steering rod bracket 76 may be aligned with attachment openings 47, 59 in portal box 35 and mounting assembly 50. Attachment opening 78 may be sized to receive an attachment member 90 that has passed through portal box 35 and mounting assembly 50, attaching steering rod bracket 76 to portal hub assembly 20. Additional attachment openings 79 may be found on the side of steering rod bracket 76 to attach steering rod bracket 76 directly to spacer plate 82 at openings 84 (not shown in FIG. 10, see FIG. 3). Multiple attachment points to mounting assembly 50 and spacer plate 82 give steering rod bracket 76 additional strength and stiffness to withstand force applied on steering rod bracket 76 by the steering rod of the vehicle without plastically deforming. Additionally, separating the steering rod bracket 76 from mounting brackets 71, 73 reduces the likelihood of breaking one of the brackets 71, 73, 76 as the force applied on mounting brackets 71, 73 by the vehicle suspension system and the force applied on steering rod bracket 76 by the steering rod are isolated from each other.

The bracket system 70 shown in FIG. 10 is a representative example of one type of bracket system that may be attached to mounting body 51 to form mounting assembly 50. Different models of vehicles typically require different mounting assemblies that correspond with the position and shape of the suspension components of that specific vehicle. Different mounting brackets may be manufactured for each different model of vehicle and selectively attached to a mounting body in the correct position to form different mounting assemblies.

Similarly, the steering rod bracket 76 shown in FIG. 10 is a representative example of one type of steering rod bracket that may be attached to mounting assembly 50. A different shape or a different position for the steering rod bracket may be needed to allow the steering rod bracket to work with different makes and models of vehicles. The different shaped steering rod brackets may be manufactured and the correct shape of steering rod bracket may be selectively chosen for the desired vehicle. The steering rod bracket may then be attached in the correct location for the desired vehicle to allow the steering rod bracket to receive the steering rod.

Additionally, some embodiments of mounting assembly 50 may not require a steering rod bracket 76. For example, a vehicle with front wheel steering typically needs a steering rod bracket 76 on the mounting assembly 50 attached to the portal hub assembly 20 on the front wheels, but does not need a steering rod bracket 76 attached to the mounting assembly 50 attached to the portal hub assembly 20 on the back wheels.

Figure 11:
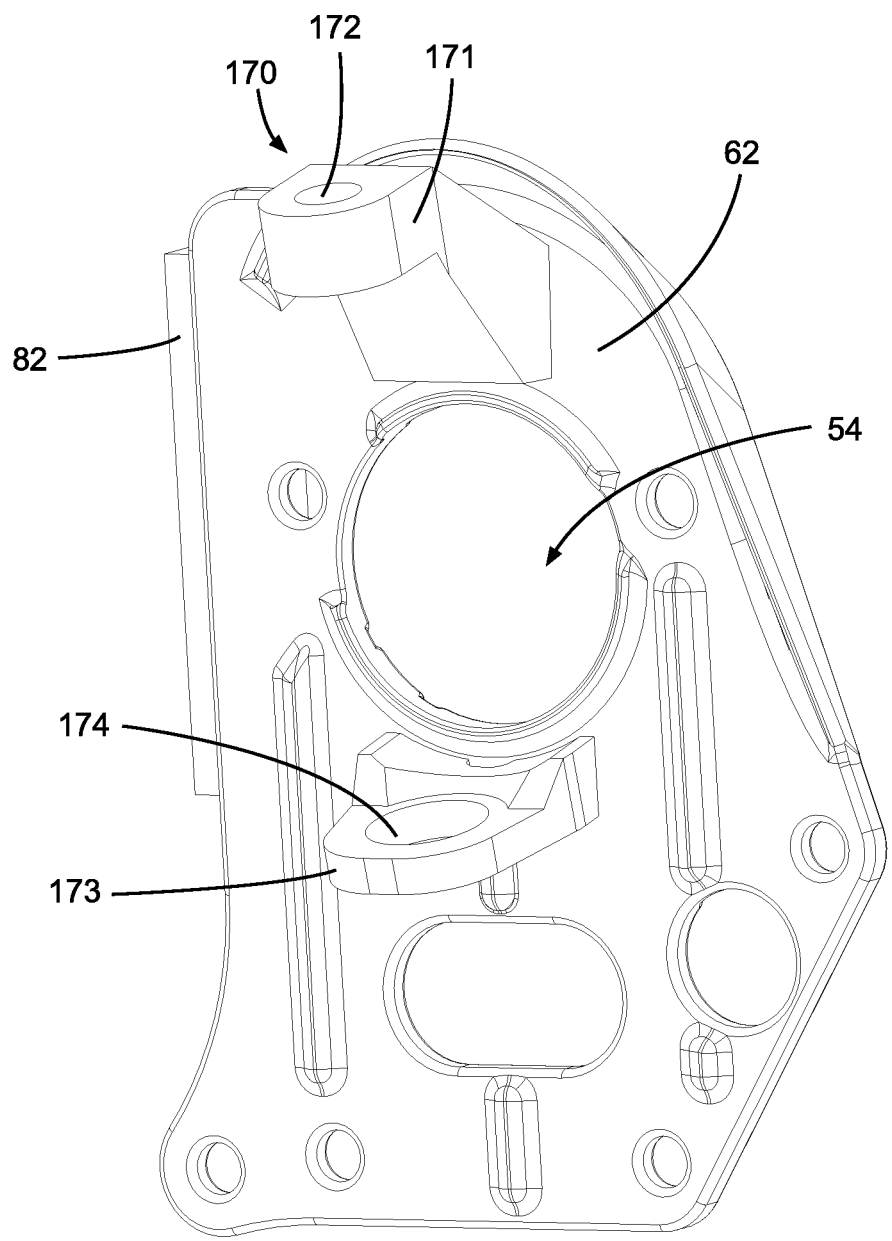
FIG. 11 is a rear perspective view of an alternate embodiment of a mounting assembly with a second type of bracket system attached to the mounting body.

One example of an alternative embodiment of a bracket system 170 is shown in FIG. 11. Bracket system 170 includes two mounting brackets 171, 173 welded to and extending from vehicle side surface 62. Each mounting bracket 171, 173 is configured to receive a component from a vehicle suspension system and includes an attachment opening 172, 174 which may receive an attachment member for securing the vehicle suspension component to the mounting bracket 171, 173. Mounting bracket 171 is positioned above input opening 54 and angled upward. Mounting bracket 173 is located below input opening 54. Attachment opening 174 defined in mounting bracket 173 has a larger diameter than attachment opening 172 defined in mounting bracket 171. In other embodiments, the size of attachment openings 172, 174 may be changed to fit the particular vehicle suspension component that is received each respective mounting bracket 171, 173.

Figure 12:
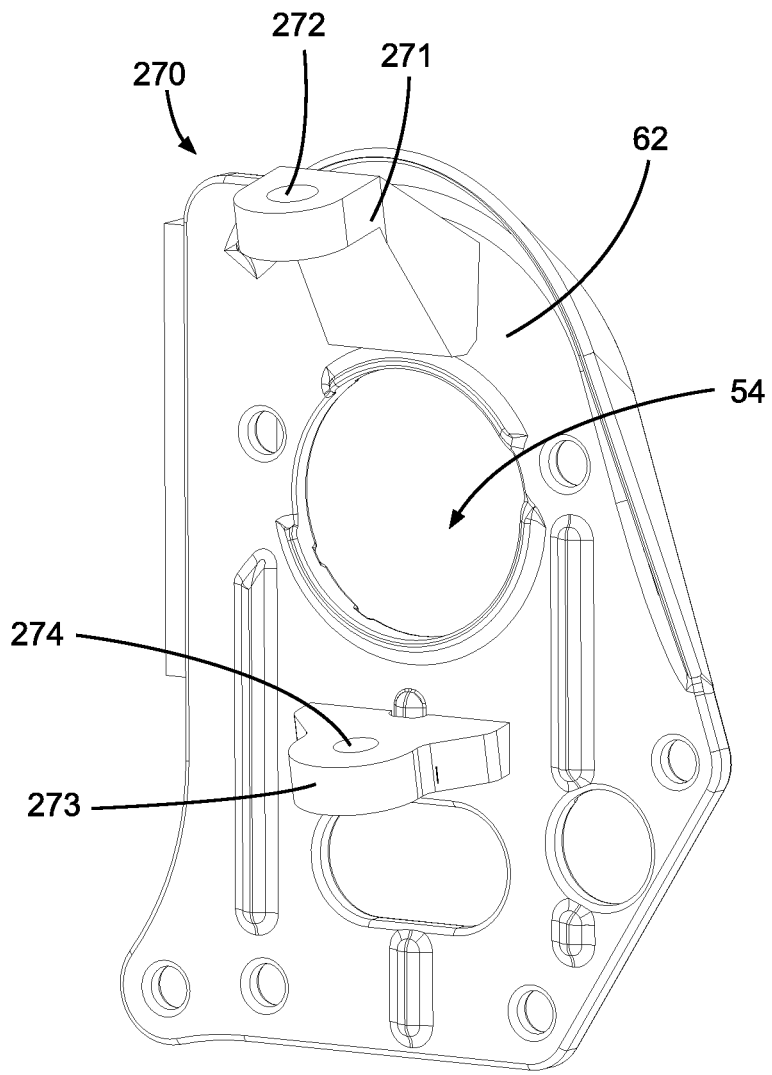
FIG. 12 is a rear perspective view of another alternate embodiment of a mounting assembly with a third type of bracket system attached to the mounting body.

Yet another alternative embodiment of a bracket system 270 is shown in FIG. 12. Bracket system 270 includes two mounting brackets 271, 273 extending from vehicle side surface 62. Each mounting bracket 271, 273 is configured to receive a component from a vehicle suspension system and includes an attachment opening 272, 274 which may receive an attachment member for securing the vehicle suspension component to the mounting bracket 271, 273. Mounting bracket 271 is located above input opening 54 and angled similar to mounting bracket 171. Mounting bracket 273 is located below input opening 54 at a position lower than mounting bracket 173. Because mounting bracket 273 is designed to be used with a different vehicle with a vehicle suspension component that is a different shape and at a different location than the vehicle suspension component attached to mounting bracket 173, mounting bracket 273 has a different shape and a smaller attachment opening 274 than mounting bracket 173.

In other embodiments, the mounting brackets 71, 73 in the bracket system 70 are not constrained to a directly vertical relationship as shown in FIGS. 10-12. Either mounting bracket 71, 73 may be moved to any other desired location on mounting body 51. For example, mounting bracket 73 may be moved away from the center of mounting body 51 and closer to edge 67. In other embodiments, mounting bracket 63 may be moved so it is positioned below opening 56. Mounting bracket 71 may also be moved to a different position. For example, mounting bracket 71 may be moved to either side of input opening 54 or below input opening 54.

Figure 13:
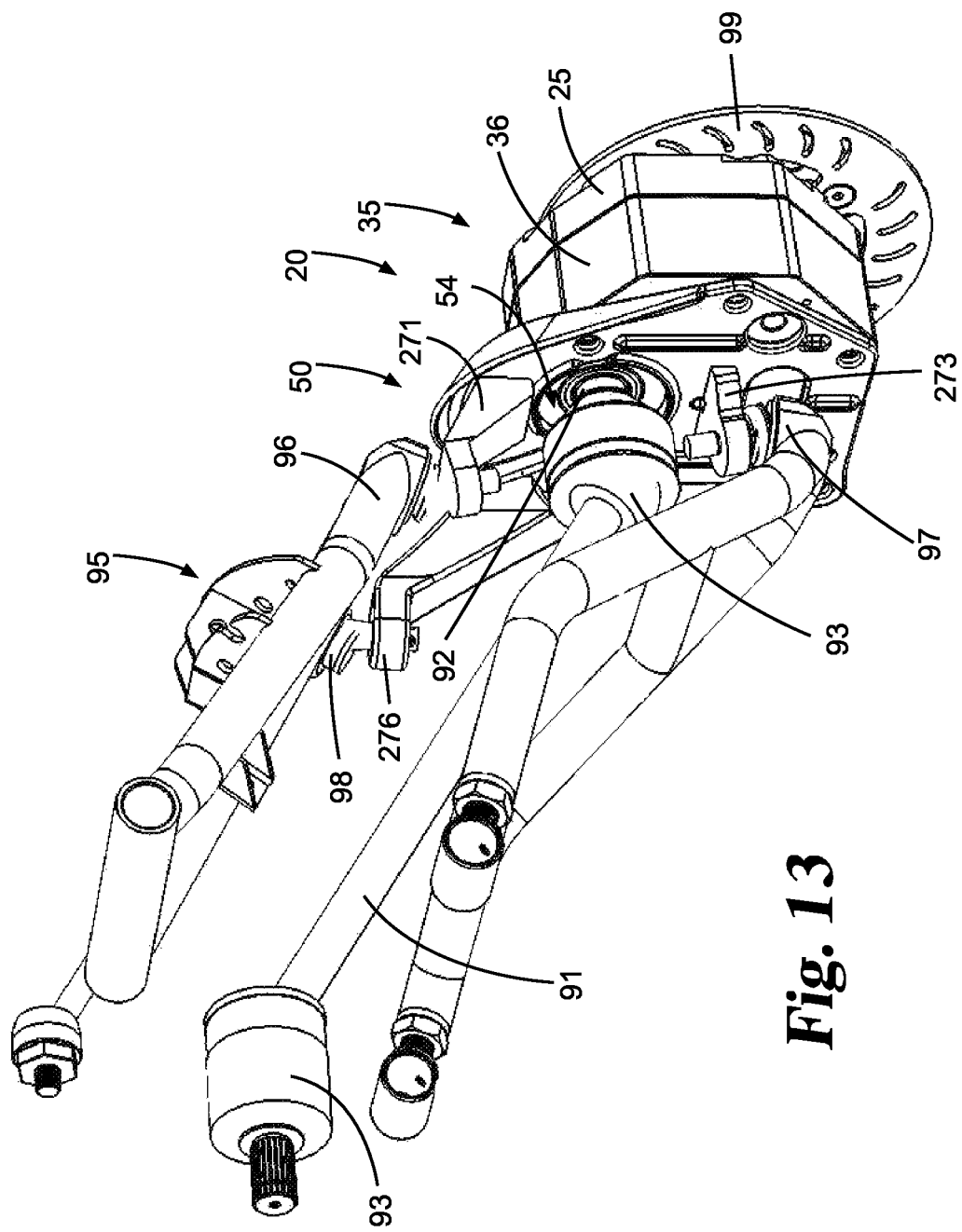
FIG. 13 is a rear perspective view of a portal hub assembly attached to a suspension system of a vehicle.

A representative example of portal hub assembly 20 attached to components of a suspension system of a vehicle is shown in FIG. 13. Suspension system 95 includes an axle 91 connected between two CV joints 93 and an upper arm 96 and a lower arm 97. Upper arm 96 attaches to mounting assembly 50 at mounting bracket 271. Lower arm 97 attaches to mounting assembly 50 at mounting bracket 273. Steering rod 98 is attached to a steering rod bracket 276. Input shaft 92 is attached to a CV joint 93 that is attached to axle 91 and input shaft 92 is positioned to fit through opening 54 in mounting body 50 and input opening 46 in housing 36.

A brake rotor 99 is attached to cover 25 of portal box 35. A tire (not shown) may be attached to the wheel side of portal hub assembly 20 so that brake rotor 99 is sandwiched between the tire and portal box 35.

Figure 14:
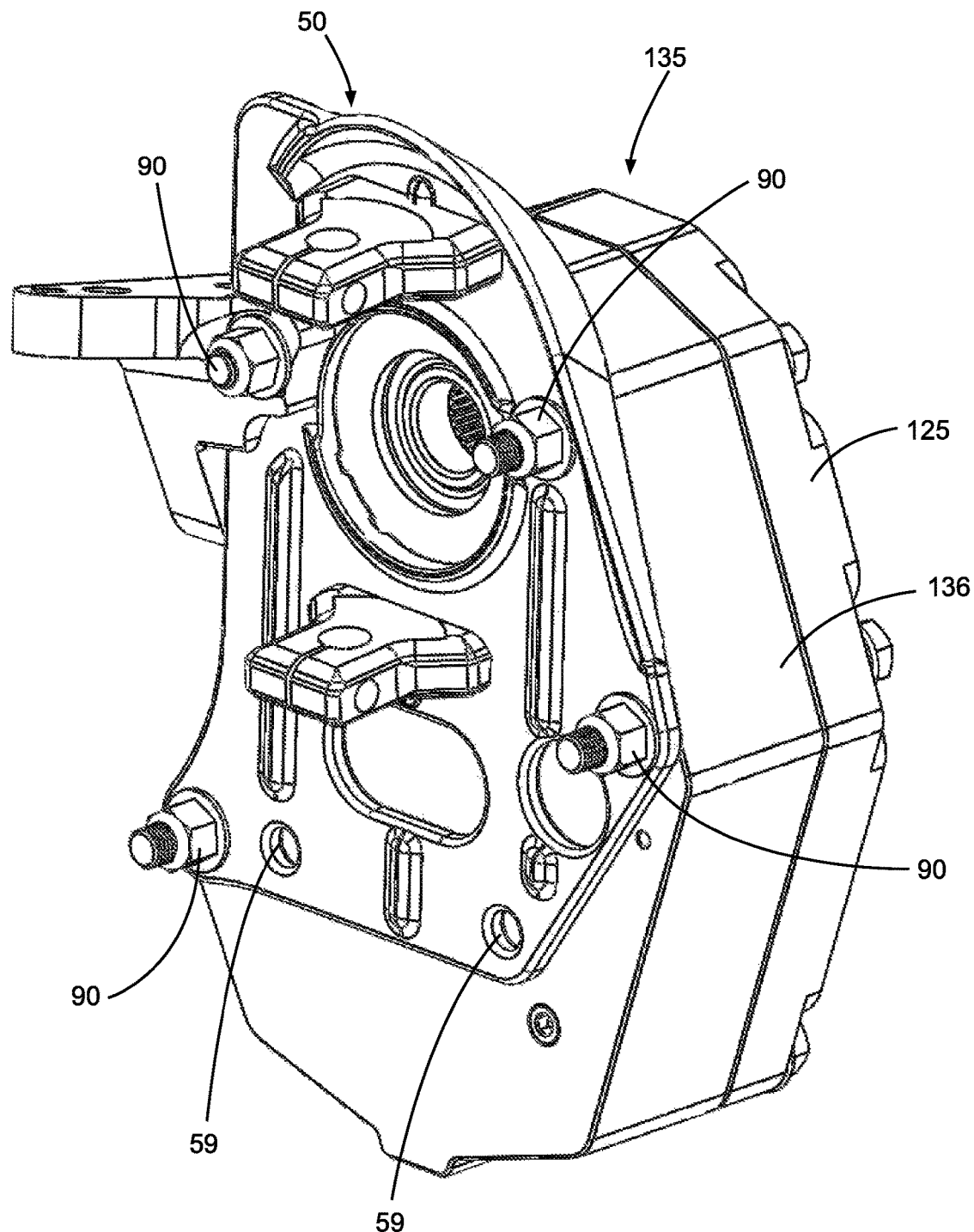
FIG. 14 is a rear perspective view of the mounting assembly of FIG. 10 attached to an alternate embodiment of a portal box.

In an alternative embodiment, mounting assembly 50 may be attached to a larger portal box, such as a portal box 135 (see FIG. 14). As shown in FIG. 14, portal box 135 includes a larger housing 136 and cover 125 compared to housing 36 and cover 25. Despite the larger size of portal box 135, the same mounting assembly 50 that is attached to portal box 35 may also be attached to portal box 135. To attach mounting assembly 50 to portal box 135, an attachment member 90 is inserted through each of the upper attachment openings 59 (not shown in FIG. 14, see FIG. 6). Also, an attachment member 90 is inserted through opening 57 and another attachment member 90 is inserted through opening 61. No attachment members 90 are inserted through lower attachment openings 59 in mounting body 50.

The differences between portal boxes 35 and 135 may be related to the relative axial displacement each box provides. For example, the illustrated portal box 35 provides a four inch lift while the illustrated portal box 135 provides a six inch lift. It should be understood that mounting assembly 50 can be configured for use with other portal box designs, including portal boxes with different amounts of lift.

Figure 15:
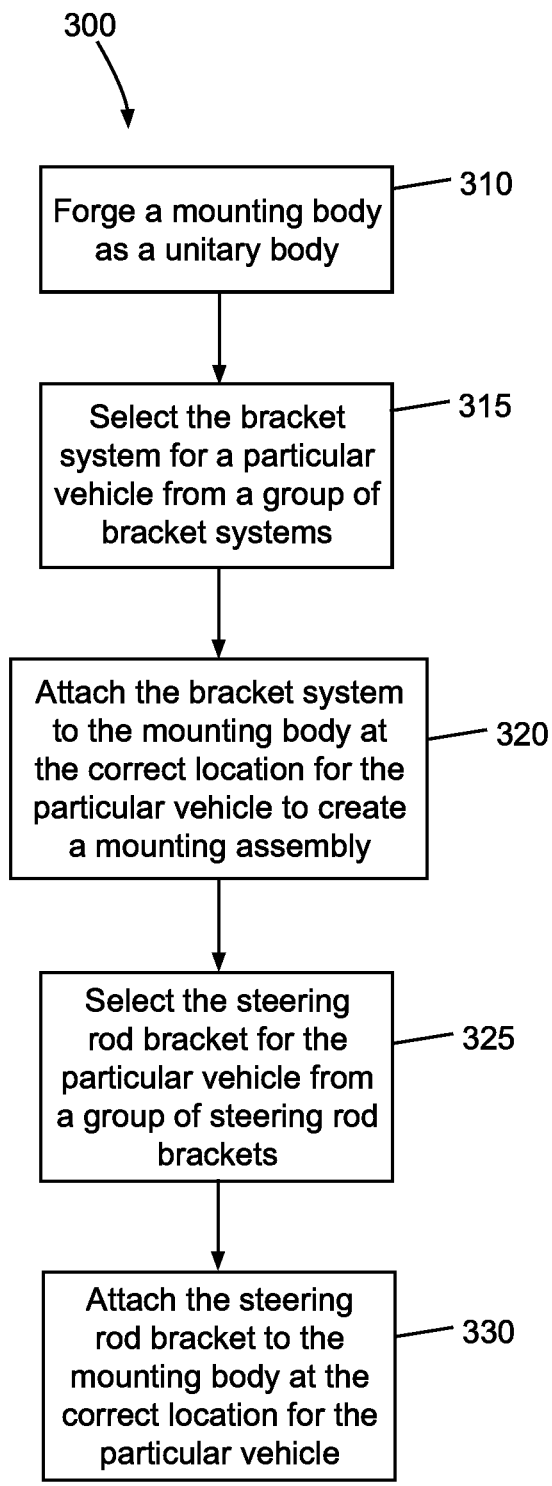
FIG. 15 is a flow chart for a method of constructing a mounting assembly to be mounted on the wheel of a vehicle.

As shown in FIG. 15, process 300 is a method of constructing a mounting assembly to be mounted on the wheel of a vehicle. Process 300 begins with step 310, where a mounting body is forged as a unitary body. The mounting body is designed to be somewhat universal so that it may be incorporated as part of the portal hub assembly for many different models of desired vehicles. A mounting body is specifically forged to be incorporated on either the left side of the vehicle or the right side of the vehicle. The left and right side mounting bodies are mirror images of each other.

In step 315, the bracket system that corresponds to the vehicle on which the portal hub mounting assembly is to be mounted is selected from a group of bracket systems. A bracket system may include one or more mounting brackets that are adapted to receive at least one component of the suspension system of a vehicle. The suspension systems of different vehicles may have different positioning of the vehicle suspension component that is attached to the bracket system. Therefore, bracket systems with different geometries may be necessary to fit different makes and models of vehicles. The bracket systems may be pre-manufactured and specifically designated for specific makes or models of vehicles. When selecting the bracket system to be mounted on the mounting body, the user chooses the bracket system that is specifically designed for their desired vehicle.

In step 320, the bracket system is attached to the mounting body at the correct location to receive one or more components from the suspension system of the desired vehicle. The position of the bracket system depends on the model of vehicle on which the portal hub is to be installed. Different models of vehicles may have different positioning for the vehicle suspension components connected to the bracket system. Therefore, the bracket system may be selectively attached to the mounting body to specifically fit the necessary position for the desired vehicle.

For some embodiments, the next step 325 is to select the correct steering rod bracket for the desired vehicle from a group of different steering rod brackets. This is an optional step that is not required for the construction of all mounting assemblies. For example, some mounting assemblies may be attached to a rear wheel on a vehicle with front wheel steering. For these vehicles, there is no steering rod attached to the rear wheels, so a steering rod bracket is not necessary on the mounting assemblies of the rear wheels.

Similar to the mounting brackets attached to the portal hub mounting assembly, different steering rod brackets may be pre-manufactured with different geometries to fit specific models of vehicle. When constructing the mounting assembly, the correct steering rod bracket is chosen to match the desired vehicle. In step 330, the steering rod bracket is then selectively attached to the mounting body at the correct location for the desired vehicle. The steering rod bracket may also be attached at different locations on the mounting body to correspond with the position of the steering rod for different types of vehicles.

Figure 16:
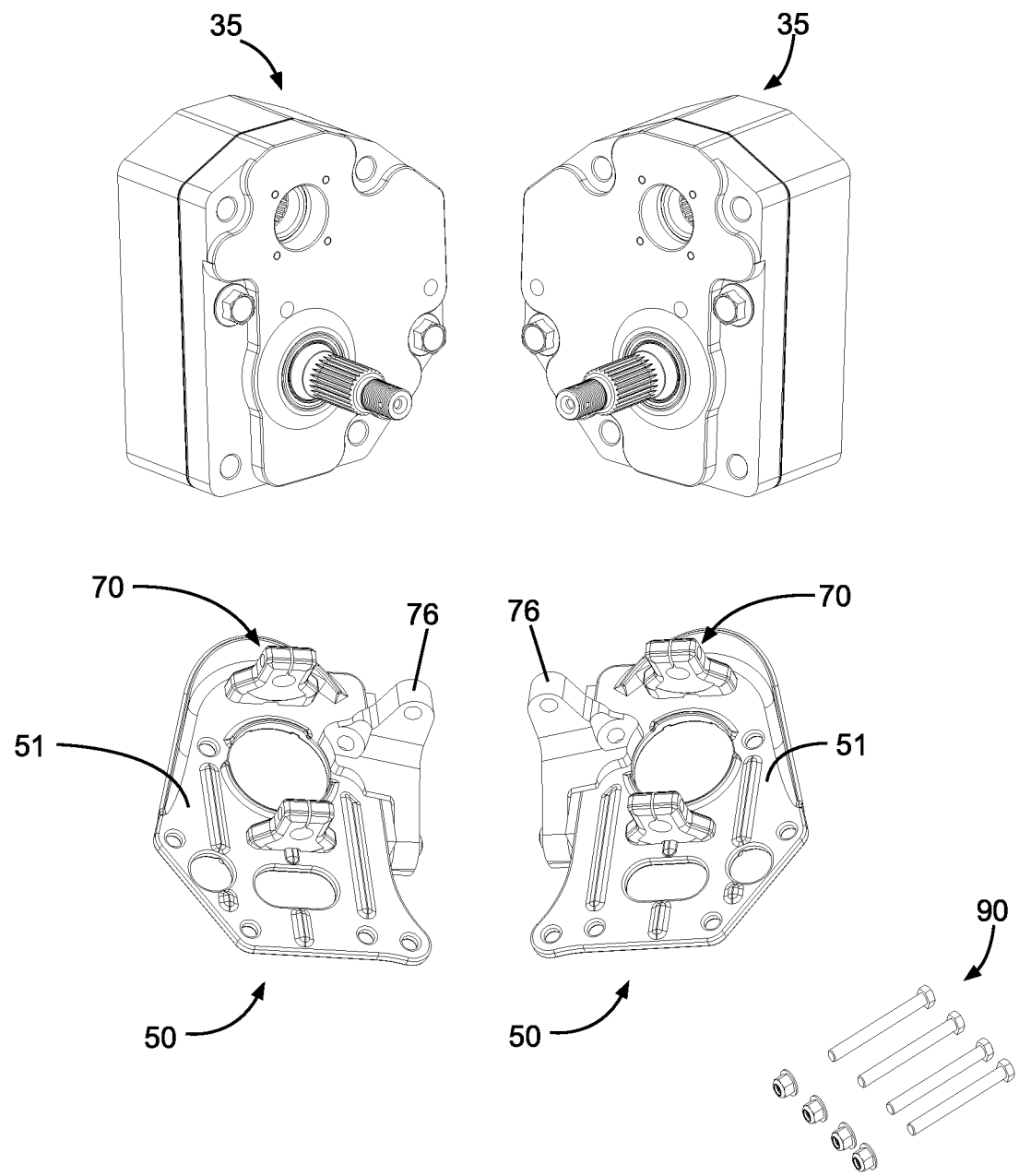
FIG. 16 is a kit for raising the chassis of a vehicle.

FIG. 16 shows a kit 400 for raising the chassis of a vehicle. The kit includes two portal boxes 35, two mounting assemblies 50, and attachment members 90 for attaching a mounting assembly 50 to a portal box 35.

Each portal box 35 defines an input opening for receiving an input shaft and includes an output shaft vertically displaced from the input opening. The portal boxes 35 are identical so either portal box 35 may be used on either the right side or left side of the vehicle. In contrast, the mounting assemblies 50 (and mounting bodies 51) are mirror images of each other. One mounting assembly 50 is specifically designed for use on the left side of the vehicle, and the other mounting assembly 50 is designed for use on the right side of the vehicle. Conversely, portal boxes 35 may be universal between different wheels and different vehicles.

Each mounting assembly 50 includes a bracket system 70 that is attachable to the mounting body 51 of mounting assembly 50. Bracket system 70 is adapted to receive a component from a vehicle suspension system. Different embodiments of kit 400 may be designed for use with different models of vehicle by varying the location of bracket system 70. Bracket system 70 is selectively attachable to mounting body 51 to allow bracket system 70 to correspond with the geometry of the suspension system of a desired vehicle and receive the vehicle suspension component of that vehicle.

In the embodiment shown in FIG. 16, each bracket system 70 includes two mounting brackets, but other mounting assemblies may include only one mounting bracket, or more than two mounting brackets. In other embodiments, bracket system 70 does not need to include brackets, but may be any structure that allows bracket system 70 to receive a component of a vehicle suspension system.

Steering rod brackets 76 are an optional feature of kit 400. Steering rod brackets 76 are attachable to mounting assembly 50. Each steering rod bracket 76 is selectively attachable to mounting assembly 50 to allow steering rod bracket 76 to receive a steering rod from a desired model of vehicle. The position and shape of steering rod bracket 76 may be changed in different embodiments of kit 400 to correspond to different models of vehicles. In some embodiments, no steering rod brackets 76 are attached to mounting assembly 50.

Figure 17:
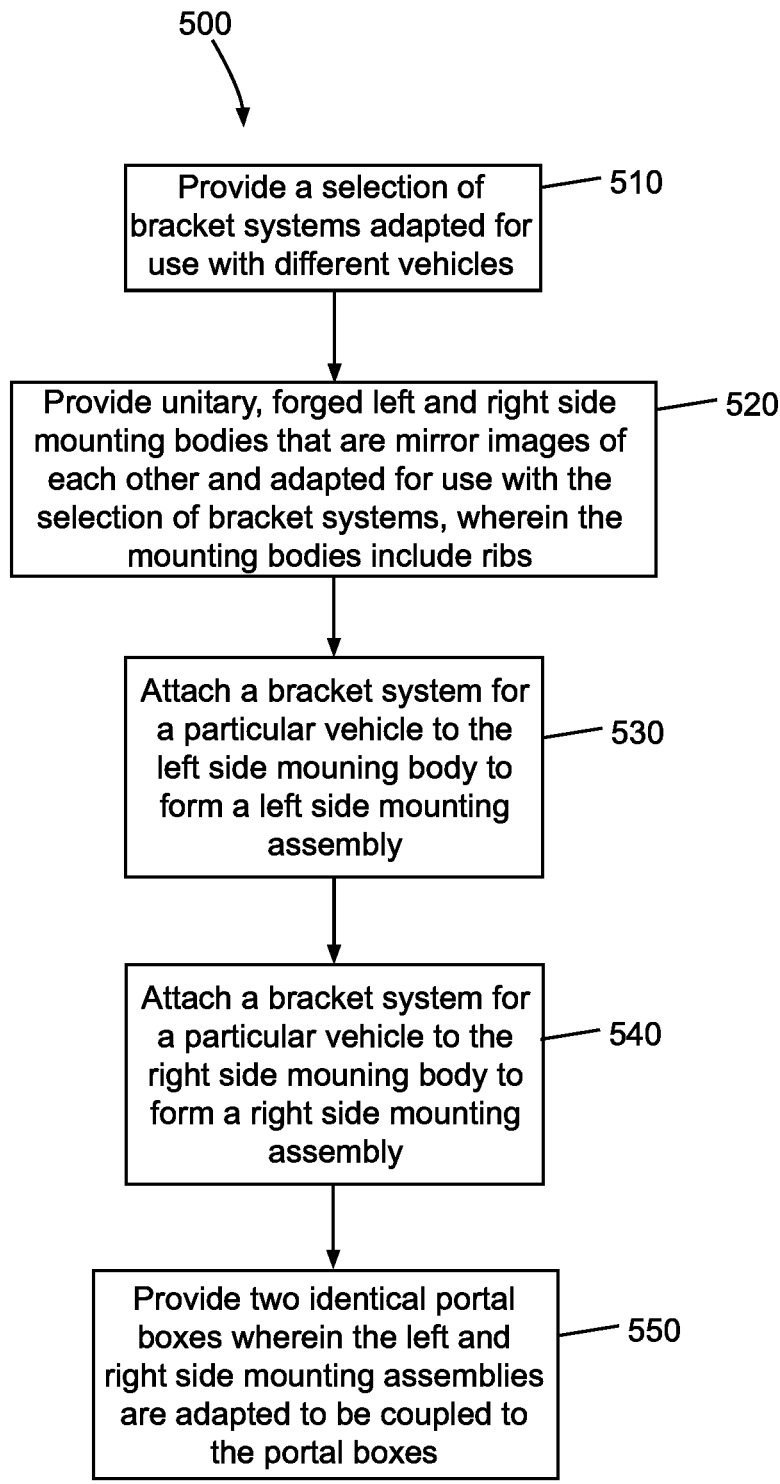
FIG. 17 is a flow chart for a method of creating the kit of FIG. 16.

As shown in FIG. 17, process 500 is a method for creating a kit for raising the chassis of a specific model of a desired vehicle. Process 500 begins with step 510, where a selection of bracket systems adapted for different vehicles is provided. This selection of bracket systems may include bracket systems with different numbers of mounting brackets and mounting brackets that have different shapes and geometries.

The next step 520 is to provide left and right side unitary body forged mounting bodies that are adapted to be used with the selection of bracket systems provided in step 510. The forged mounting bodies are mirror images of each other. Each mounting body includes ribs on at least on side of the mounting body, such that the surfaces of the mounting bodies are irregular.

In step 530, a bracket system for a particular model of vehicle is attached to the forged, left side mounting body to form a left side mounting assembly. Similarly, in step 540, a bracket system for the particular model of vehicle is attached to the forged, right side mounting body to form a right side mounting assembly.

In step 550, two identical portal boxes are provided. The left and right side mounting assemblies formed in step 530 and step 540 are adapted to be coupled to the portal boxes.

In some embodiments, a selection of steering rod brackets adapted for use with different models of vehicles may also be provided. The correct steering rod brackets for the particular model of vehicle may be chosen and attached to the left side and right side mounting bodies.

Some other embodiments may include providing spacer plates attachable to an edge of each of the mounting bodies. A spacer plate may be attached to a mounting body so that the spacer plate abuts both the mounting body and a steering rod bracket. Other embodiments may also include providing attachment members configured to attach the mounting assemblies to the portal boxes.

It should be understood that process 500 is merely a representative example of one method for creating a kit. The order in which the components of the kit are added to the kit may be varied in other embodiments.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:

1. A portal hub assembly comprising:
a portal box;
an input opening in said portal box configured to receive an input shaft;
an output opening in said portal box configured to receive an output shaft, wherein said output opening is vertically displaced from said input opening;
a mounting assembly removably attachable to a side of said portal box, wherein said mounting assembly comprises a mounting body forged as a unitary body having a deformed grain structure due to forging, wherein one side of said mounting body includes a plurality of elongated ribs that are unitarily forged with said mounting body, and wherein the one side of said mounting body defines a generally flat partition;
a bracket system comprising at least one mounting bracket adapted to receive a component from a particular vehicle model suspension system, wherein the at least one mounting bracket defines a mounting body surface that abuts the generally flat partition; and
wherein said bracket system is selectively affixed to said mounting body to configure said mounting assembly to receive the component from the particular vehicle model suspension system.

2. The portal hub assembly of claim 1, further comprising a steering rod bracket adapted to attach to a steering rod of a vehicle, wherein said steering rod bracket is attachable to said mounting body.

3. The portal hub assembly of claim 2, further comprising a spacer plate attached to an edge of said mounting body.

4. The portal hub assembly of claim 3, wherein said steering rod bracket is attached to said mounting body so said spacer plate abuts both said steering rod bracket and said mounting body.

5. The portal hub assembly of claim 1, wherein said bracket system comprises a second mounting bracket, and wherein said second mounting bracket is adapted to receive a second component from the particular vehicle model suspension system.

6. The portal hub assembly of claim 1, wherein said mounting body defines at least one access opening that is not aligned with either said input opening or said output opening of said portal box, and wherein said access opening allows access to said portal box through said mounting body.

7. The portal hub assembly of claim 1, wherein at least one attachment opening is defined in said mounting body, and said at least one attachment opening is adapted to receive an attachment member for attaching said mounting assembly to said portal box.

8. The portal hub assembly of claim 1, wherein said portal box includes a flat surface configured to engage a flat surface of said mounting assembly.

9. The portal hub assembly of claim 1, wherein said plurality of elongated ribs includes an elongated rib that is oriented vertically on said mounting body.

10. The portal hub assembly of claim 1, wherein said portal box alters the transmission ratio between the input shaft and the output shaft.

11. The portal hub assembly of claim 1, wherein a side of said mounting body opposite of said side of said mounting body with said ribs defines a plurality of elongated grooves.

12. The portal hub assembly of claim 1, wherein a top edge of said mounting body includes an arched rib that projects farther from a said side of said mounting body than the other of said elongated ribs on said mounting body.

13. A mounting assembly for use with the portal hub assembly of claim 1, the mounting assembly comprising:
   said mounting body including a wheel side and a vehicle side, wherein said wheel side of said mounting body defines a substantially planar surface, wherein said vehicle side of said mounting body includes said generally plat partition and said plurality of elongated ribs which defines an irregular surface that is nonplanar;
   said bracket system extending from said vehicle side of said mounting body;
   a steering rod bracket attachable to said mounting body and extending from said vehicle side of said mounting body, wherein said steering rod bracket is adapted to connect to a steering rod of a vehicle and wherein said steering rod bracket does not contact said bracket system; and,
   wherein said bracket system and said steering rod bracket on said mounting body are selected from a plurality of different bracket systems and a plurality of different steering rod brackets configured for a plurality of different vehicle models to fit said mounting body to the particular vehicle model.

14. The mounting assembly of claim 13, wherein said bracket system includes two mounting brackets, wherein each of said mounting brackets is adapted to receive a component from a vehicle suspension system.

15. The mounting assembly of claim 13, wherein said plurality of different bracket systems are each configured to be selectively affixed to said mounting body.

16. The mounting assembly of claim 13, wherein at least one attachment opening is defined in said mounting body, and said at least one attachment opening is adapted to receive an attachment member for attaching the mounting assembly to a portal box.

17. The mounting assembly of claim 13, further comprising a spacer plate attached to an edge of said mounting body.

18. The mounting assembly of claim 17, wherein said steering rod bracket is attached to said mounting body so said spacer plate abuts both said steering rod bracket and said mounting body.

19. A method of constructing a mounting assembly for use with the portal hub assembly of claim 1, wherein the mounting assembly can be mounted on the wheel of a vehicle, the method comprising the acts of:
   forging the mounting body as the unitary body wherein the one side of the mounting body has a surface that is irregularly shaped and nonplanar, and wherein the forging deforms the grain structure of the mounting body;
   selecting the bracket system from a of plurality of different bracket systems, wherein the selected bracket system corresponds to the particular vehicle model and wherein the selected bracket system is adapted to receive a component from the vehicle suspension system of the particular vehicle model; and,
   attaching the selected bracket system to the mounting body at the generally flat partition on the one side of the mounting body.

20. The method of claim 19 further comprising:
   selecting a steering rod bracket from a plurality of different steering rod brackets, wherein the selected steering rod bracket corresponds to the particular vehicle model and wherein the selected steering rod bracket is adapted to receive a steering rod of the particular vehicle model; and,
   attaching the selected steering rod bracket to said mounting body in a location on the mounting body that allows the selected steering rod bracket to receive the steering rod of the particular vehicle model.

21. The method of claim 19, wherein a mounting body adapted to be mounted on the right side of the vehicle is the mirror image of a mounting body adapted to be mounted on the left side of the vehicle.

* * * * *

UNITED STATES PATENT AND TRADEMARK OFFICE
CERTIFICATE OF CORRECTION

PATENT NO. : 10,479,156 B2
APPLICATION NO. : 15/270128
DATED : November 19, 2019
INVENTOR(S) : Justin L. Eaton et al.

It is certified that error appears in the above-identified patent and that said Letters Patent is hereby corrected as shown below:

In the Claims

Column 12, Claim 19, Line 31, delete the word "of"

Signed and Sealed this
Thirty-first Day of December, 2019

Andrei Iancu
*Director of the United States Patent and Trademark Office*